(12) United States Patent

Kolle

(10) Patent No.: US 12,631,082 B1

(45) Date of Patent: May 19, 2026

(54) ROTARY FLOW CONTROL APPARATUS

(71) Applicant: TEMPRESS TECHNOLOGIES, INC., Renton, WA (US)

(72) Inventor: Jack J. Kolle, Seattle, WA (US)

(73) Assignee: Tempress Technologies, Inc., Renton, WA (US)

( * ) Notice: Subject to any disclaimer, the term of this patent is extended or adjusted under 35 U.S.C. 154(b) by 0 days.

(21) Appl. No.: 19/229,083

(22) Filed: Jun. 5, 2025

(51) Int. Cl.
| | |
|---|---|
| *E21B 31/00* | (2006.01) |
| *E21B 4/02* | (2006.01) |
| *E21B 23/10* | (2006.01) |
| *E21B 34/10* | (2006.01) |
| *F01L 7/10* | (2006.01) |
| *F16K 31/16* | (2006.01) |
| *E21B 47/18* | (2012.01) |

(52) U.S. Cl.
CPC ........... *E21B 31/035* (2020.05); *E21B 23/10* (2013.01); *E21B 34/10* (2013.01); *F01L 7/10* (2013.01); *F16K 31/16* (2013.01); *E21B 4/02* (2013.01); *E21B 47/18* (2013.01); *E21B 2200/02* (2020.05); *E21B 2200/04* (2020.05)

(58) Field of Classification Search
None
See application file for complete search history.

(56) References Cited

U.S. PATENT DOCUMENTS

| | | | | | |
|---|---|---|---|---|---|
| 2,743,083 | A | * | 4/1956 | Zublin | E21B 7/24 |
| | | | | | 175/232 |
| 2,780,438 | A | | 2/1957 | Bielstein | |

| | | | | | |
|---|---|---|---|---|---|
| 3,539,147 | A | * | 11/1970 | Paul, Jr. | F16K 5/0647 |
| | | | | | 251/304 |
| 4,716,968 | A | * | 1/1988 | Pringle | E21B 34/10 |
| | | | | | 166/319 |
| 4,819,745 | A | | 4/1989 | Walter | |
| 4,877,429 | A | | 10/1989 | Hunter | |
| 4,953,595 | A | | 9/1990 | Kotlyar | |
| 5,009,272 | A | | 4/1991 | Walter | |
| 6,237,701 | B1 | | 5/2001 | Kolle et al. | |
| 6,279,670 | B1 | | 8/2001 | Eddison et al. | |
| 6,439,318 | B1 | | 8/2002 | Eddison et al. | |
| 6,508,317 | B2 | | 1/2003 | Eddison et al. | |
| 7,139,219 | B2 | | 11/2006 | Kolle et al. | |

(Continued)

FOREIGN PATENT DOCUMENTS

| | | |
|---|---|---|
| EP | 3482031 | 8/2021 |

*Primary Examiner* — Blake Michener

(74) *Attorney, Agent, or Firm* — Morgan, Lewis & Bockius LLP

(57) ABSTRACT

A rotary flow control apparatus may comprise a rotary drive mechanism coupled to a ball controller comprising a ball disposed within a cavity. The apparatus may be disposed within a tubing string in a wellbore. Fluid flow is provided though the tubing, causing the rotation of the rotary drive mechanism. The flow passes through a ball cage above a seat disc that incorporates a flow port. The ball orbits around the cavity in response to the motion of an axially extending surface or "kicker." When the ball obstructs the flow port, it substantially blocks the flow of fluid through the assembly, generating a water hammer impulse in the tubing above the rotary drive mechanism. The rotating kicker moves the ball off the flow port at one angular position and then allows the ball to reseat at a second angular position.

20 Claims, 20 Drawing Sheets

(56)     References Cited

U.S. PATENT DOCUMENTS

| | | | | |
|---|---|---|---|---|
| 8,167,051 | B2 | 5/2012 | Eddison et al. | |
| 8,596,300 | B2 * | 12/2013 | Graham | E21B 34/02 |
| | | | | 137/236.1 |
| 8,939,217 | B2 | 1/2015 | Kolle | |
| 9,109,442 | B2 | 8/2015 | Forster | |
| 9,273,529 | B2 | 3/2016 | Eddison et al. | |
| 9,598,923 | B2 * | 3/2017 | Gilleylen | E21B 7/24 |
| 9,637,976 | B2 * | 5/2017 | Lorenson | E21B 7/065 |
| 10,358,872 | B2 | 7/2019 | Rossing et al. | |
| 11,002,099 | B2 | 5/2021 | Clausen et al. | |
| 11,753,901 | B2 * | 9/2023 | Schultz | E21B 7/24 |
| | | | | 166/316 |
| 12,305,481 | B2 * | 5/2025 | von Gynz-Rekowski | |
| | | | | E21B 7/24 |
| 12,366,131 | B2 * | 7/2025 | Nyberg | E21B 4/02 |
| 2001/0054515 | A1 * | 12/2001 | Eddison | E21B 7/24 |
| | | | | 175/57 |
| 2007/0187112 | A1 * | 8/2007 | Eddison | E21B 31/005 |
| | | | | 166/380 |
| 2016/0281449 | A1 * | 9/2016 | Lorenson | E21B 21/10 |
| 2018/0340388 | A1 * | 11/2018 | Lorenson | E21B 4/02 |
| 2019/0024459 | A1 * | 1/2019 | Sicilian | E21B 6/04 |
| 2022/0275685 | A1 * | 9/2022 | Trinh | E21B 4/02 |

* cited by examiner

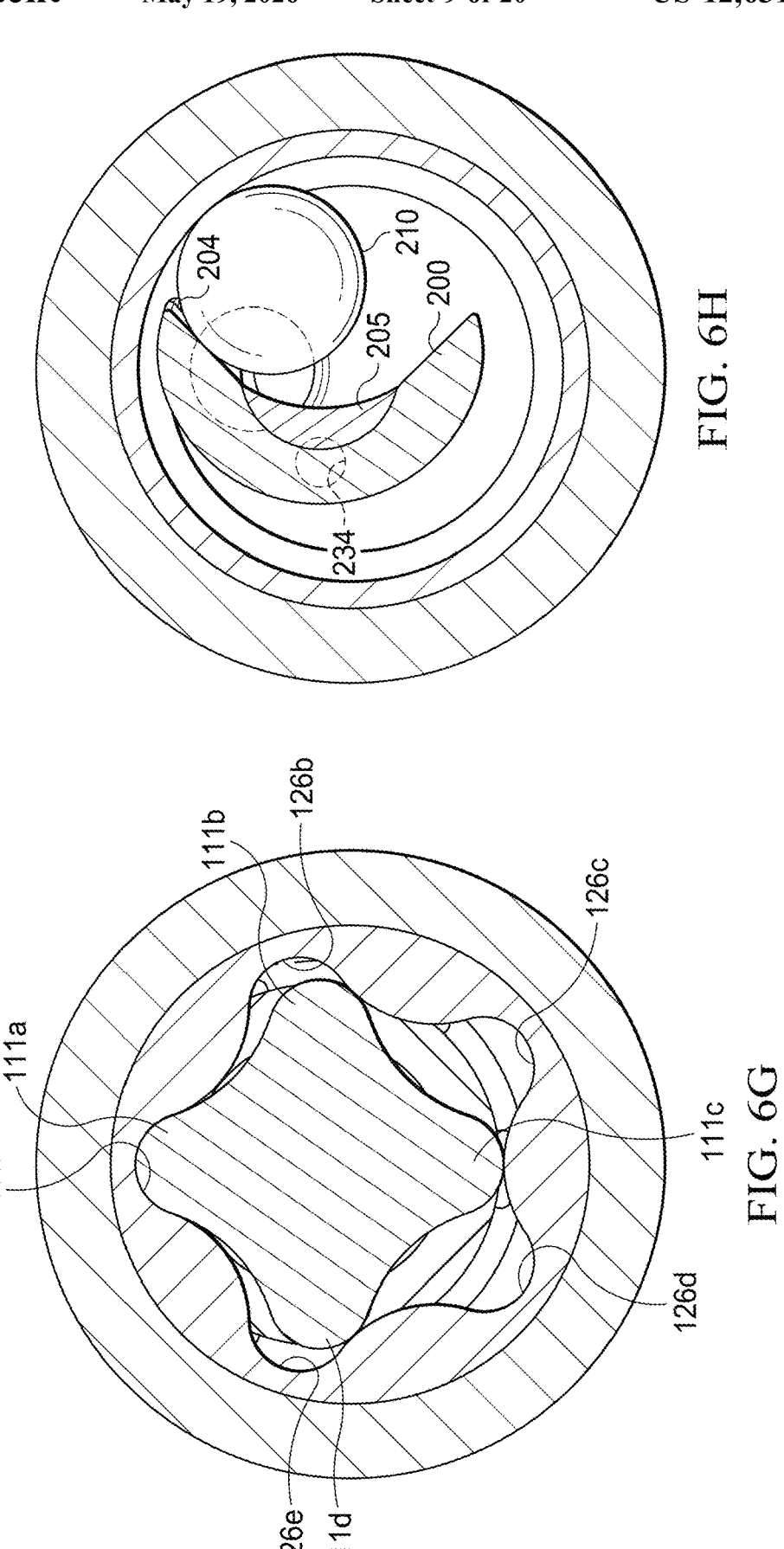

ROTARY FLOW CONTROL APPARATUS

TECHNICAL FIELD

The present disclosure relates generally to a tool configured to create pressure pulses in fluid pumped through tubing inserted into a well. More particularly, the present disclosure relates to a tool employing a rotary flow control apparatus coupled to a rotary drive mechanism, such as a positive displacement motor, that generates a variable pulse profile.

BACKGROUND OF THE INVENTION

Fluid is commonly pumped though tubing inserted into a well to drill or to provide intervention services such as stimulation or milling of obstructions. Pressure pulsations in the tubing disposed upstream of the bottom hole assembly (BHA) provide a plurality of beneficial effects. Accordingly, means for pulsing this flow have been developed for a variety of applications, including mud pulse telemetry, well stimulation, enhanced drilling, and for use in extending the lateral range of drilling motors or other well intervention tools. For example, the pulsations can improve the performance of rotary drilling by applying a cyclical mechanical load on the bit and a cyclic pressure load on the material that is being cut. In combination, these loads can enhance cutting. The vibrations induced by these cutting tools in the tubing can reduce the friction required to feed the tubing into long lateral or horizontal wells. In addition, the pressure pulses can also be used to generate a signal that can be employed for seismic processing.

One type of device used to create downhole pressure pulses is a tool employing a poppet valve that is actuated by a self-piloted spool valve to create a "water hammer" effect. For example, U.S. Pat. Nos. 6,237,701; 7,139,219; and 8,939,217, which are assigned to the same assignee of the present invention, disclose hydraulic impulse generators incorporating self-piloted poppet valves designed to periodically stop the flow of fluid at the bottom end of the tubing. Stopping the flow leads to an increase in pressure upstream of the valve and a decrease in pressure downstream of the valve. Accordingly, a poppet valve such as that disclosed in U.S. Pat. No. 8,939,217 closes very quickly because the pressure causing the valve to close increases rapidly as the valve closes. This valve then opens relatively slowly because the opening pressure forces are relatively limited and decrease as the poppet opens. The ideal pulse profile for extended reach applications is a sharp increase in force, which breaks friction in the tubing and impels the tubing forward in the well. Accordingly, the water hammer pulse profile produced by tools such as those described above has proven to be the most effective approach for extended reach applications. One drawback of these tools, however, is that they require relatively clean fluid to operate reliably because the tolerances of the valves are small and subject to particle erosion and jamming. Fluid solids removal can be costly and is not always feasible, for example when highly stable foam completion fluids are used.

Another type of device used to create downhole pressure pulses is a tool employing a positive displacement (or Moineau-type (see U.S. Pat. No. 1,892,217)) motor to rotate a flow restrictor such as a disc or cylinder with one or more ports rotating against a fixed disc or tube containing opposing ports. For example, such devices are disclosed in U.S. Pat. Nos. 6,279,670; 6,508,317; 6,439,318; 8,167,051;

9,109,442; 9,273,529; and 10,358,872. Unlike the tools such as those disclosed in U.S. Pat. No. 8,939,217, these rotary tools are relatively resistant to jamming by sand because the power section of the positive displacement motor incorporates an elastomeric stator that accommodates common sand contamination. One drawback of these tools, however, is that the pressure profile they generate is not as effective for extending the reach of tubing in horizontal wells. In particular, rotary port valve closing times are limited by geometry and the fixed rotation rate of the positive displacement motor. Thus, these valves tend to close more gradually than a poppet valve, which results in oscillation of the tubing that may reduce friction, but does not provide a net downhole impulse force similar to the "water hammer" design of tools such as those disclosed in U.S. Pat. No. 8,939,217.

Accordingly, what is needed is a pulse tool driven by a rotary drive mechanism such as a positive displacement motor that is not subject to jamming or particulate wear, but which generates a pulse profile similar to tools incorporating a poppet valve, specifically a very short pulse rise time.

SUMMARY OF THE INVENTION

In one or more embodiments of the invention, a flow control apparatus may comprise a central longitudinal axis, a flow inlet, a flow outlet, a flow port disposed between the flow inlet and the flow outlet, a ball configured to intermittently obstruct a flow of fluid through the flow port, a ball controller configured to rotate about the central longitudinal axis and comprising a volume within which the ball is disposed, a lower radial surface and a surface axially extending from the lower radial surface, a rotary drive mechanism coupled to the ball controller and configured such that, during each rotation, the ball controller will have a first angular position in which the ball at least partially obstructs the flow port and a second angular position in which the ball does not obstruct the flow port.

In one embodiment, the rotary drive mechanism may be further configured such that, during each rotation, the ball controller will have a third angular position in which the ball is able to move freely toward the flow port.

In one embodiment, the ball may at least partially obstruct the flow port when the ball controller is in the third angular position.

In one embodiment, the flow control apparatus may further comprise a bypass port that allows fluid to flow from the inlet to the outlet when the ball controller is in the first angular position.

In one embodiment, the rotary drive mechanism may comprise a positive displacement power section.

In one embodiment, the positive displacement power section may comprise a rotor comprising four lobes and a stator comprising five lobes.

In one embodiment, the rotary drive mechanism may be rigidly coupled to the ball controller.

In one embodiment, the rotary drive mechanism may be flexibly coupled to the ball controller.

In one embodiment, the flow control apparatus may further comprise an expanding, conical passage disposed between the flow port and the outlet.

In one embodiment, the ball controller may further comprise a removeable wear insert.

In one embodiment, the flow control apparatus may further comprise a wear ring disposed within the flow port.

In one embodiment, the ball may be formed from one of carbide cermet, silicon nitride, or zirconia.

In one embodiment, the flow control apparatus may further comprise a seat disc in which the flow port is disposed.

In another embodiment, the invention may comprise a method of generating pressure pulses in a wellbore, the method comprising the steps of introducing into the wellbore a flow control apparatus comprising a central longitudinal axis, a flow inlet, a flow outlet, a flow port disposed between the flow inlet and the flow outlet, a ball configured to intermittently obstruct a flow of fluid through the flow port, a ball controller configured to rotate about the central longitudinal axis and comprising a volume within which the ball is disposed, a lower radial surface and a surface axially extending from the lower radial surface, a rotary drive mechanism coupled to the ball controller and configured such that, during each rotation, the ball controller will have a first angular position in which the ball at least partially obstructs the flow port and a second angular position in which the ball does not obstruct the flow port; and pumping fluid into the wellbore and through the inlet, causing rotation of the rotary drive mechanism and the ball controller.

In another embodiment, the invention may comprise a method of extending the reach of tubing within a wellbore, the method comprising introducing into the wellbore a section of tubing which includes a flow control apparatus comprising a central longitudinal axis a flow inlet, a flow outlet, a flow port disposed between the flow inlet and the flow outlet, a ball configured to intermittently obstruct a flow of fluid through the flow port, a ball controller configured to rotate about the central longitudinal axis and comprising a volume within which the ball is disposed, a lower radial surface and a surface axially extending from the lower radial surface, a rotary drive mechanism coupled to the ball controller and configured such that, during each rotation, the ball controller will have a first angular position in which the ball at least partially obstructs the flow port a second angular position in which the ball does not obstruct the flow port; and pumping fluid into the tubing and through the inlet, causing rotation of the rotary drive mechanism and the ball controller, wherein pressure pulses created by the flow control apparatus create a net downhole force tending to move the tubing farther into the wellbore.

BRIEF DESCRIPTION OF DRAWINGS

The accompanying drawings, which are included to provide further understanding and are incorporated in and constitute a part of this specification, illustrate disclosed embodiments and together with the description serve to explain the principles of the disclosed embodiments. In the drawings.

4

Figure 1:
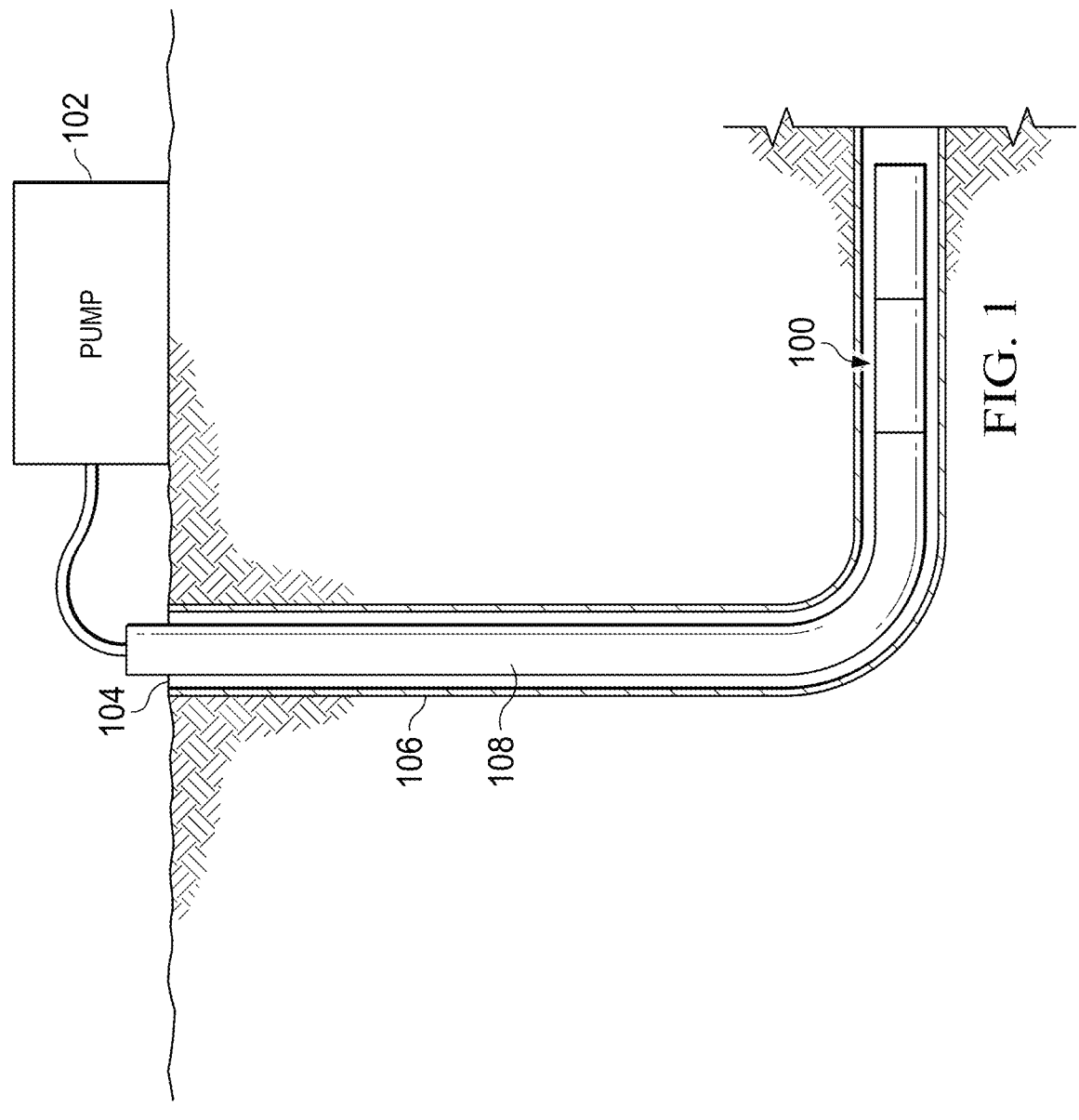
FIG. 1 depicts a cross-sectional view of one embodiment of the present invention disposed within a wellbore.
Figure 7:
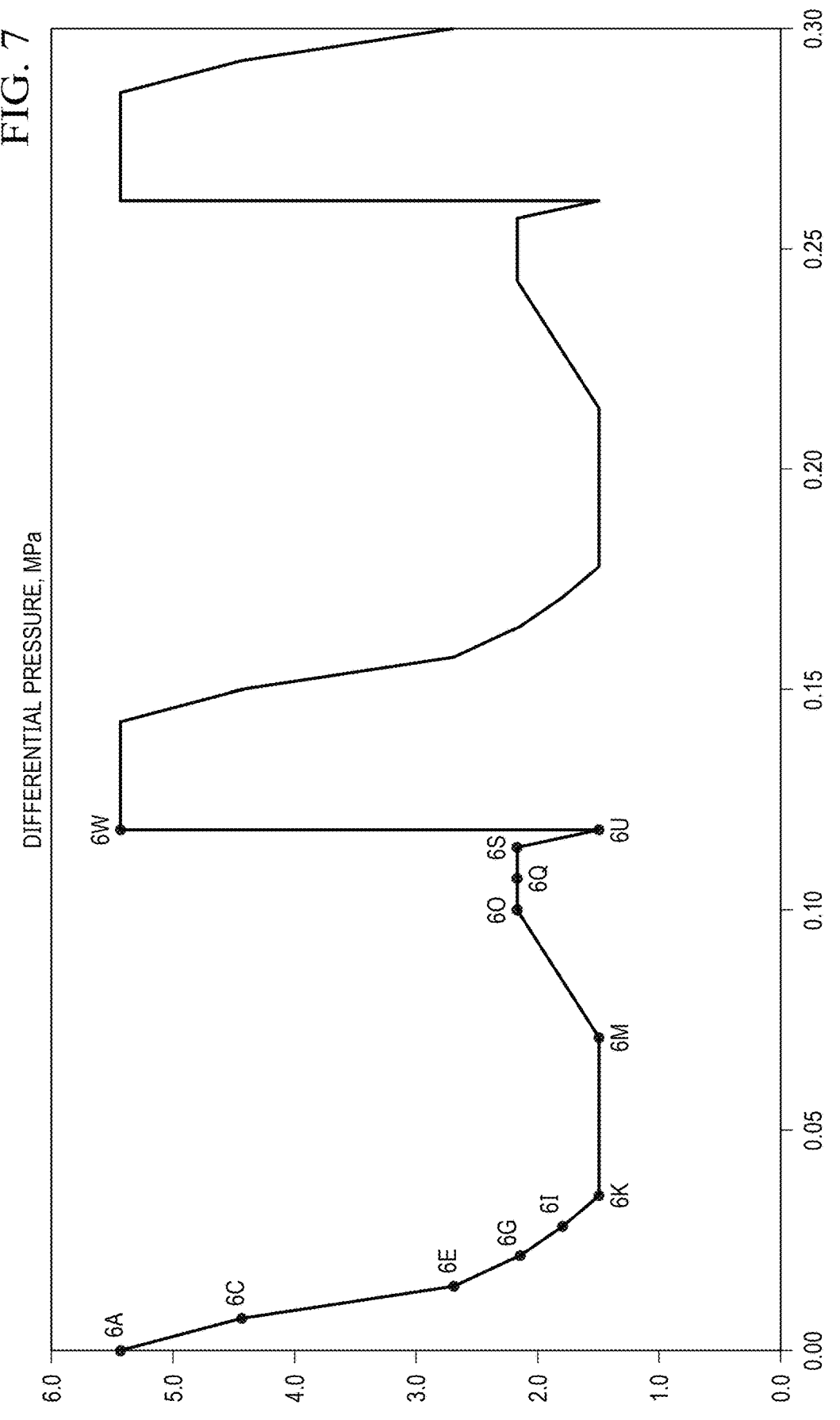

FIG. 7 depicts a model of the pressure pulses that would be generated by the embodiment shown in FIG. 1 under certain operating parameters.

Figure 8:
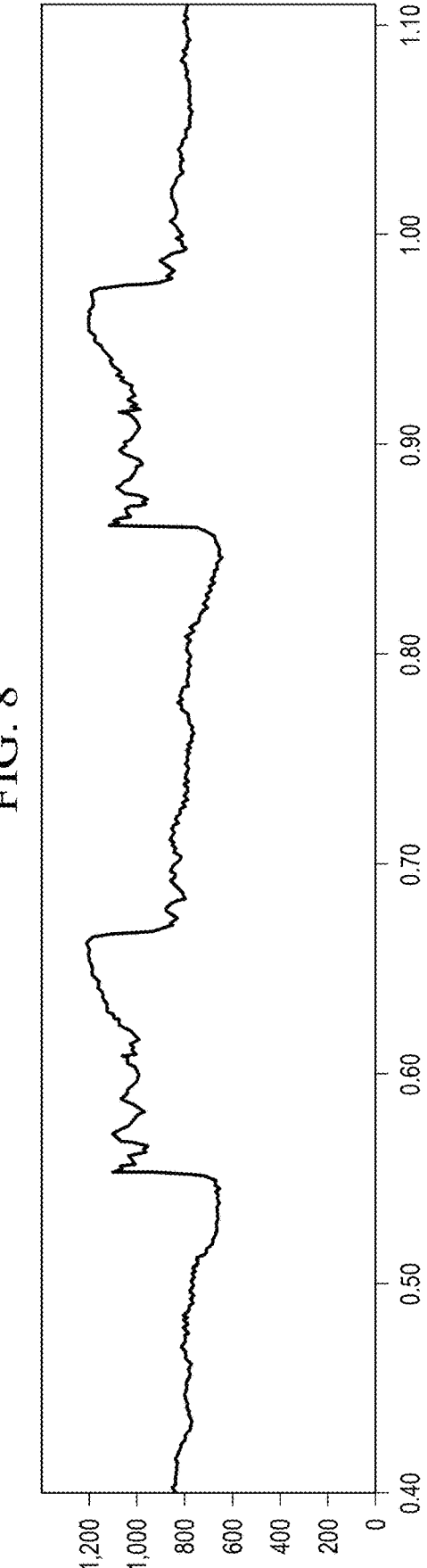

FIG. 8 depicts a graph of the pressure pulses generated by a prototype of the embodiment shown in FIG. 1.

Figure 9:
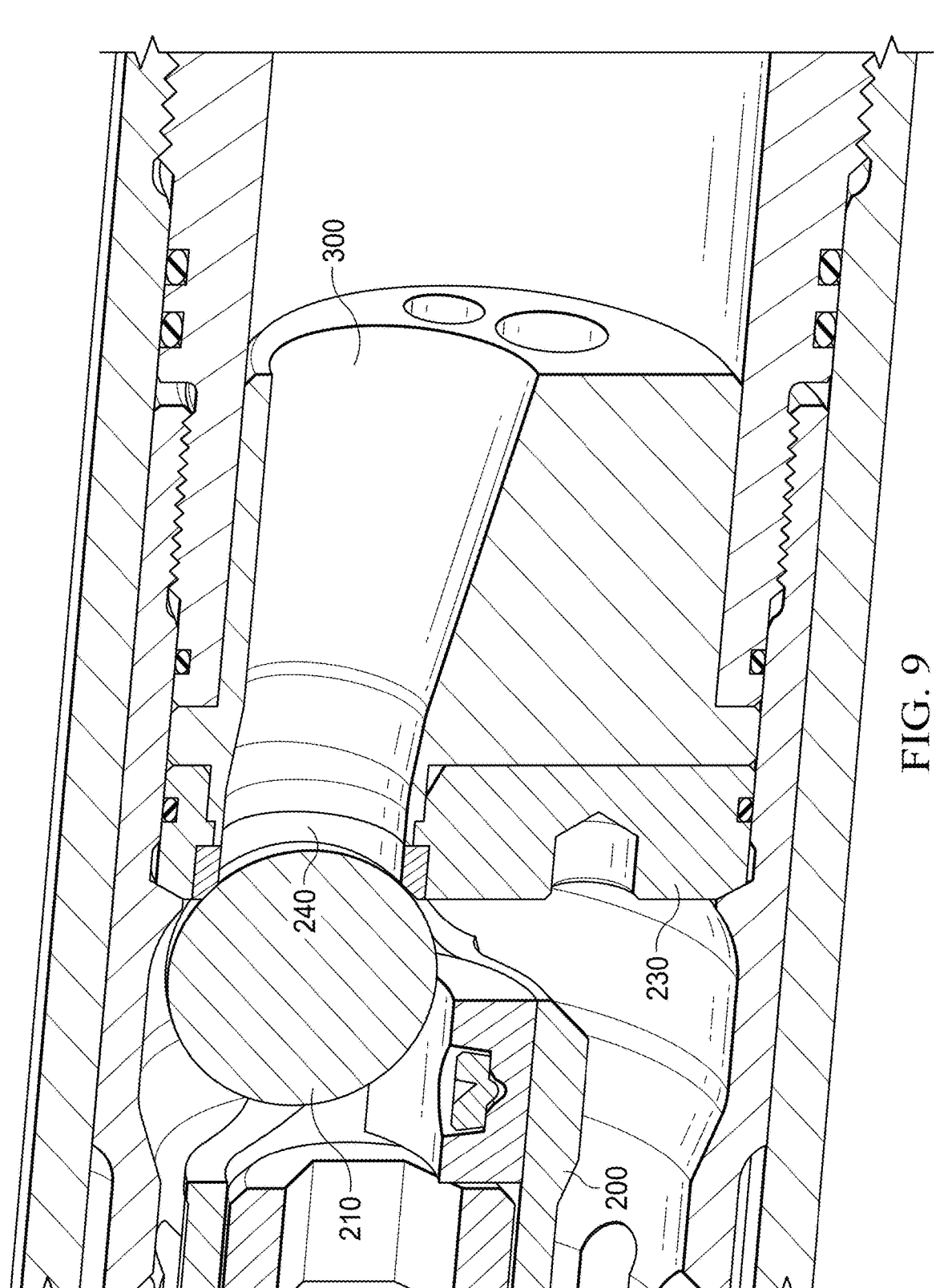

FIG. 9 depicts a perspective cut-away view of an alternate embodiment of the present invention comprising a diffuser passage.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As shown in FIG. 1, the invention may comprise an assembly 100 disposed between an inlet 150 and outlet 140. Inlet 150 may be connected to a length of tubing 108. Tubing 108 may have a length of 1000 meters or more and may be inserted into casing 106 of a wellbore. Tubing 108 may be used to supply a low-compressibility fluid, such as water with additives, which is forced by surface pump 102 to downhole equipment, including assembly 100. Water may be circulated through tubing 108, through a drill motor (not shown), through assembly 100, and returned to the surface through annulus 104 between casing 106 and tubing 108.

Figure 2:
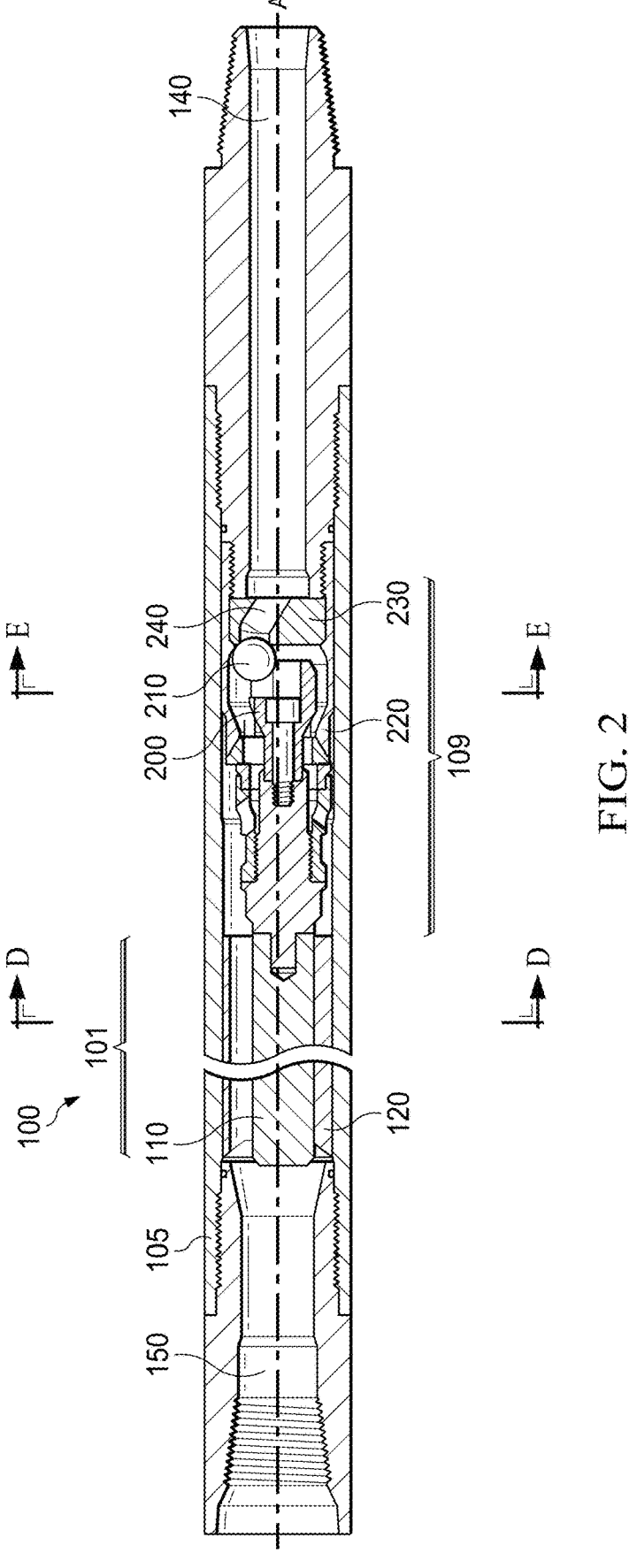
FIG. 2 depicts a cross-sectional view of a section of tubing that includes one embodiment of the present invention.
Figure 3:
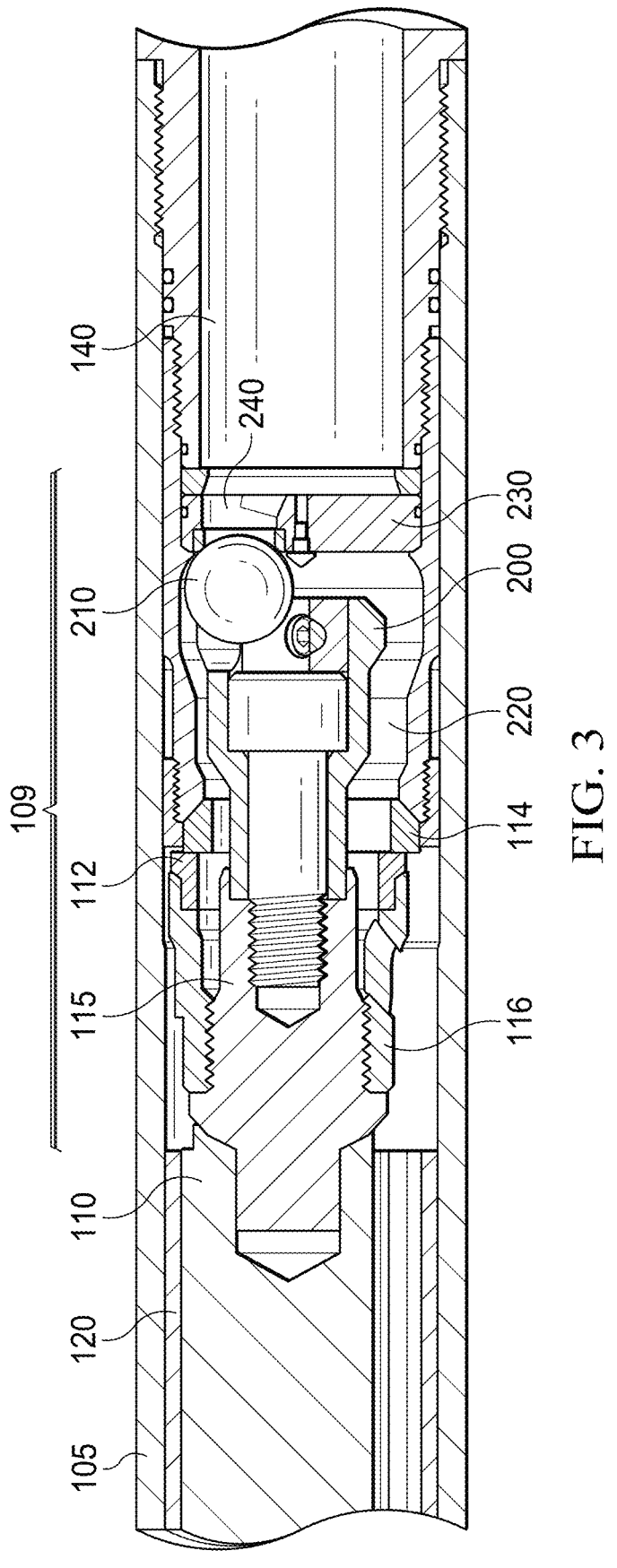
FIG. 3 depicts a cross-sectional view of a portion of the embodiment shown in FIG. 1.

As shown in FIGS. 2 and 3, in one embodiment, assembly 100 may comprise a positive displacement power section 101 and valve section 109 disposed between inlet 150 and outlet 140, all of which share a common central longitudinal axis A. Positive displacement power section 101 may comprise elastomeric stator 120 and steel rotor 110 supported by thrust bearings 112 and 114, disposed within housing 105. Fluid flow from inlet 150 to outlet 140 causes rotor 110 to rotate about an axis which counter-rotates about central longitudinal axis A relative to stator 120. The basic structure and function of a positive displacement power section 101 is well known to those of ordinary skill in the art and will not be further discussed.

Disposed downhole from positive displacement power section 101 is ball controller 200. Coupler 115 couples the uphole end of ball controller 200 to rotor 110. Alternatively, ball controller 200 may comprise threads configured to attach directly to rotor 110. Regardless of whether ball controller is attached to rotor 110 directly or via coupler 115, the hypocycloidal rotation of rotor 110 causes ball controller 200 to rotate around central longitudinal axis A following the same path followed by rotor 110 relative to stator 120. Preferably, coupler 115 is substantially rigid, although it could be flexible to reduce or effectively eliminate the off-axis motion of rotor 110 that is otherwise communicated to ball controller 200. One of ordinary skill in the art will recognize that such couplings are often used in positive displacement drill motors for the same purpose. Such a coupling, although not preferred, could comprise a flexible shaft, splined coupling or dual universal joints with a radial bearing to support ball controller 200.

Ball controller 200 may be disposed within ball cage 220. Thrust bearing 112 may be coupled to rotor 110 by flow manifold 116. Thrust bearing 112 rotates relative to thrust bearing 114, which is fixed to ball cage 220. Flow manifold 116 may be disposed such that fluid flowing through positive displacement power section 101 flows into the interior volume of ball cage 220, which is coupled to housing 105.

Coupled to the downhole end of ball controller 200 is seat disc 230, which is preferably made from a hard, erosion resistant material such as a carbide cermet or hardened steel. Disposed within seat disc 230 is flow port 240, which is intermittently blocked by ball 210 due to the rotation of ball controller 200, as described below in further detail.

Figure 4:
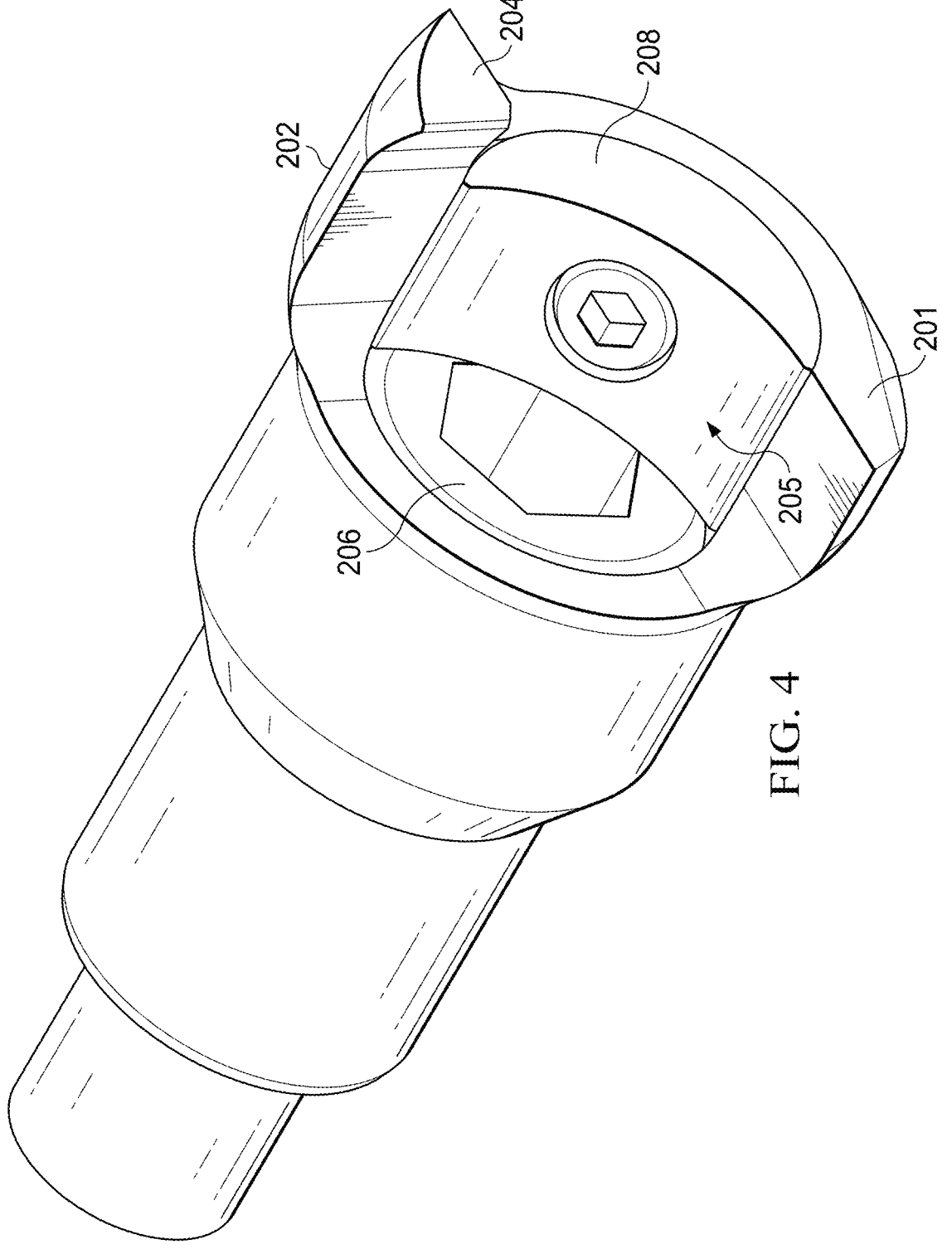
FIG. 4 depicts a perspective view of the ball controller in the embodiment shown in FIG. 1.

As shown in FIG. 4, ball controller 200 may comprise body 202, screw 206, and wear insert 208. Screw 206 may be used to couple ball controller 200 to coupler 115. Body 202 defines an inner volume 205 within which ball 210 is disposed. Ball 210 is able to move freely within ball controller 210 and is preferably made from a hard, erosion resistant material such as carbide cermet, silicon nitride, zirconia, or other ceramic. Wear insert 208 may be removably coupled to body 202, such that it may be easily removed and replaced as it experiences wear due to contact with ball 210. As an alternative to a removable wear insert, ball controller 200 may be entirely made of, and/or coated with, a hard, erosion resistant material such as carbide cermet, silicon nitride, zirconia, or other ceramic. Body 202 may comprise lower radial surface 201, as well as surface 204 which axially extends from planar lower surface 201 and functions as a "kicker" to periodically make contact with ball 210 as ball controller 200 rotates due to the rotation of rotor 110, as described below in further detail. Surface 204 may comprise a boss, as shown in 4. Alternatively, surface 204 may comprise any axially extending surface capable of dislodging ball 210 from flow port 240, as described below in further detail.

Figure 5:
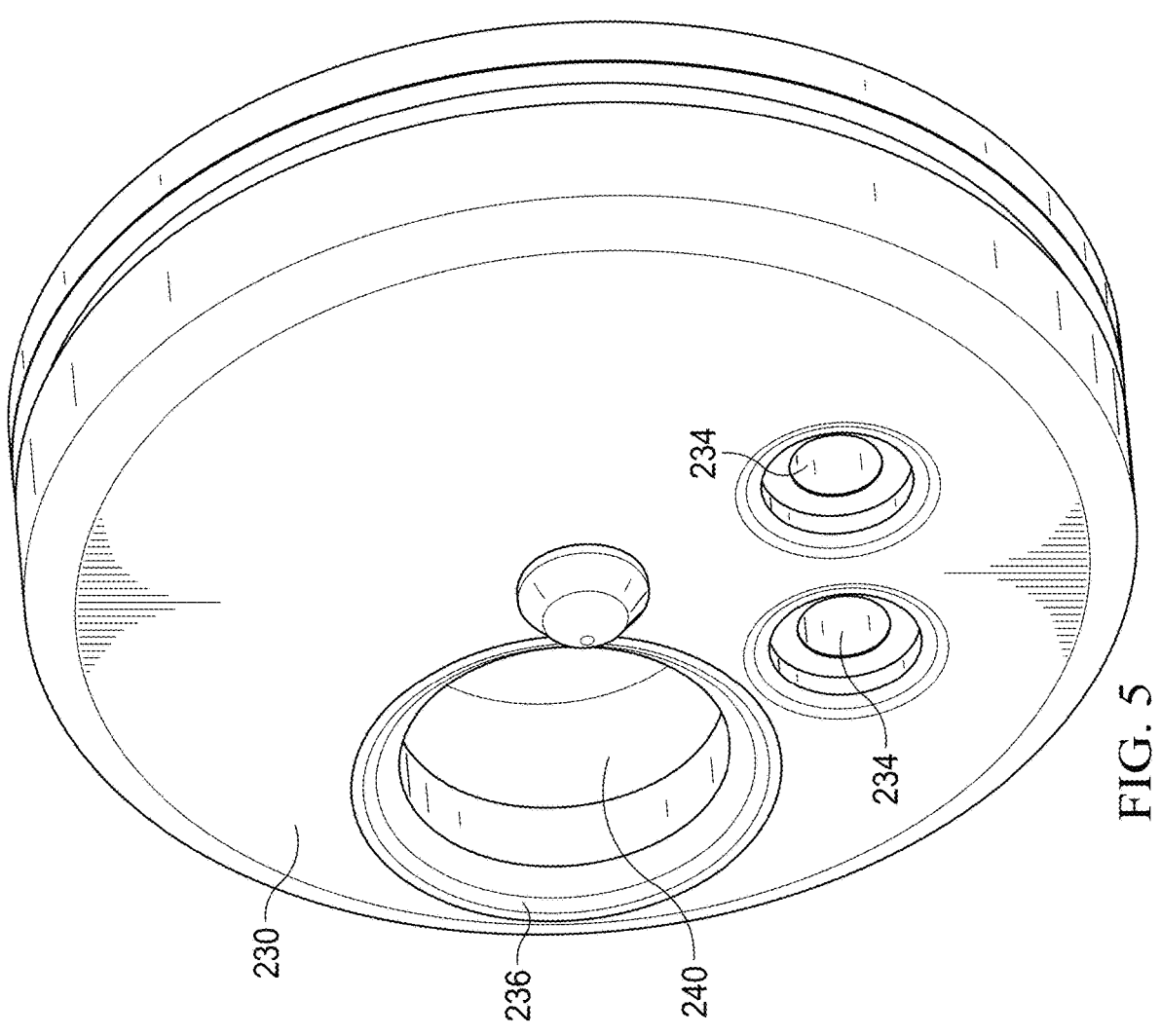
FIG. 5 depicts a perspective view of the seat disc in the embodiment shown in FIG. 1.

As shown in FIG. 5, seat disc 230 may comprise flow port 240, bypass ports 234, and wear ring 236. As noted above, seat disc 230 is configured such that flow port 240 is intermittently blocked by ball 210 due to the rotation of ball controller 200 and contact between surface 204 and ball 210.

Wear ring 236 may be disposed within flow port 240 and made from a hard, erosion resistant material such as a carbide cermet, silicon nitride, zirconia, or other ceramic. Similar wear rings may also be disposed within bypass ports 234. Wear rings disposed within flow port 240 and/or bypass ports 234 are preferably replaceable. As an alternative to replaceable wear rings, seat disc 230 may be entirely manufactured from a hard erosion resistant material such as carbide cermet, silicon nitride, zirconia, or other ceramic.

As described below in further detail, bypass ports 234 may be configured to ensure continuous rotation of rotor 110 even when flow port 240 is obstructed. Alternatively, grooves may be formed in flow port 240, such that some fluid will continue to pass through flow port 240 even when ball 210 is seated.

In operation, fluid flows through inlet 150, through positive displacement power section 101, and through flow manifold 116 into ball cage 220. If flow port 240 in seat disc 230 is blocked by ball 210, the volume of fluid flowing through outlet 140 is greatly reduced, and the pressure within the fluid will rapidly increase, as described below in further detail. As rotor 110 continues to rotate, surface 204 will dislodge ball 210 from flow port 240, thus allowing fluid to flow through flow port 240 and through outlet 140, leading to a decrease in fluid pressure. The particular sequence of events involved in the operation of the present invention is now described below in further detail.

Rotor 110 of positive displacement power section 101 describes a rotating and hypocycloidal motion. In general and in the embodiment shown here, rotor 110 rotates clockwise (looking towards the front of the tool). In doing so, rotor lobes 111a-111d enter stator lobes 126a-126e in a sequence, as described below in further detail. The center point 111e of the rotor 110 makes a full counterclockwise circulation about the center point 126f of stator 120 for every 25% of rotor rotation. In a positive displacement power section such as that shown in FIGS. 6A-6X, with 4 rotor lobes and 5 stator lobes, the lobes of rotor 110 describe a pentoid, which is the path that a point on a circle of radius 4 describes as it rolls inside a circle of radius 5. Other embodiments of the invention may comprise a positive displacement power section with different numbers of rotor and stator lobes, such as 5 rotor lobes and 6 stator lobes or 7 rotor lobes and 8 stator lobes, which will describe different hypocycloids.

Figures 6A, 6B:
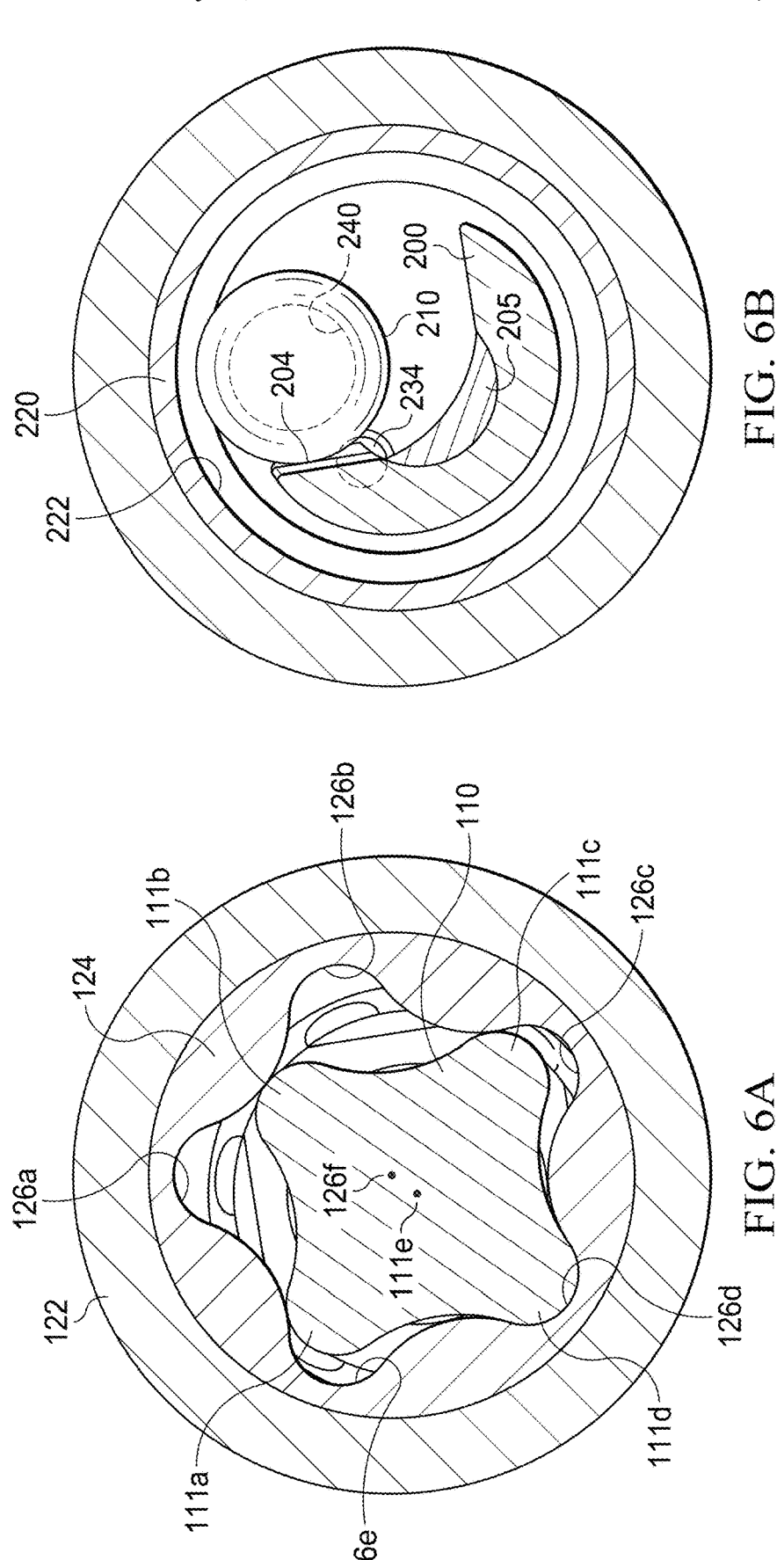
FIG. 6A-6X depict the approximate relative positions of the rotor, stator, ball controller, ball, flow port, and bypass port of the embodiment shown in FIG. 1, at various different points during a single rotational cycle.
Figures 6C, 6D:
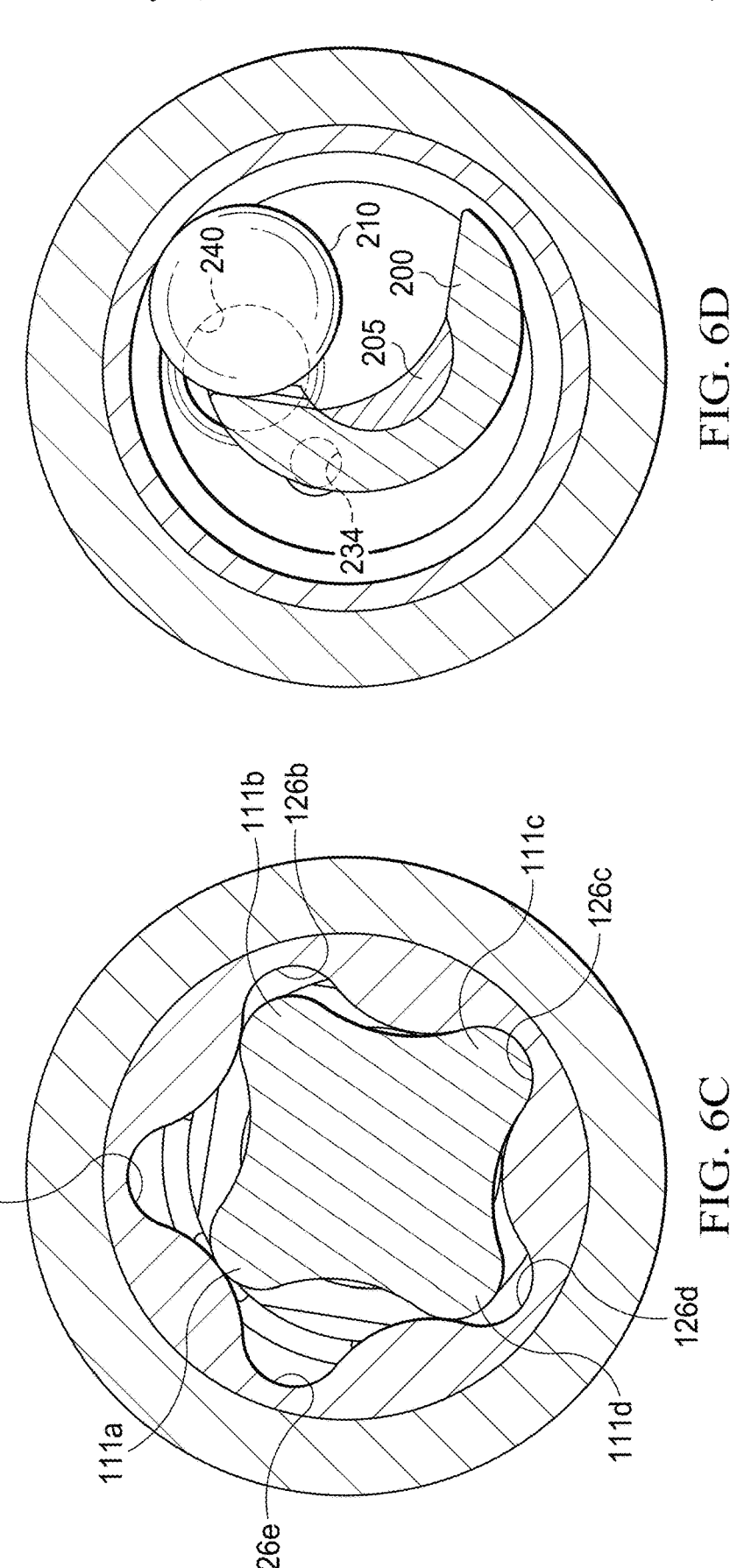
Figures 6E, 6F:
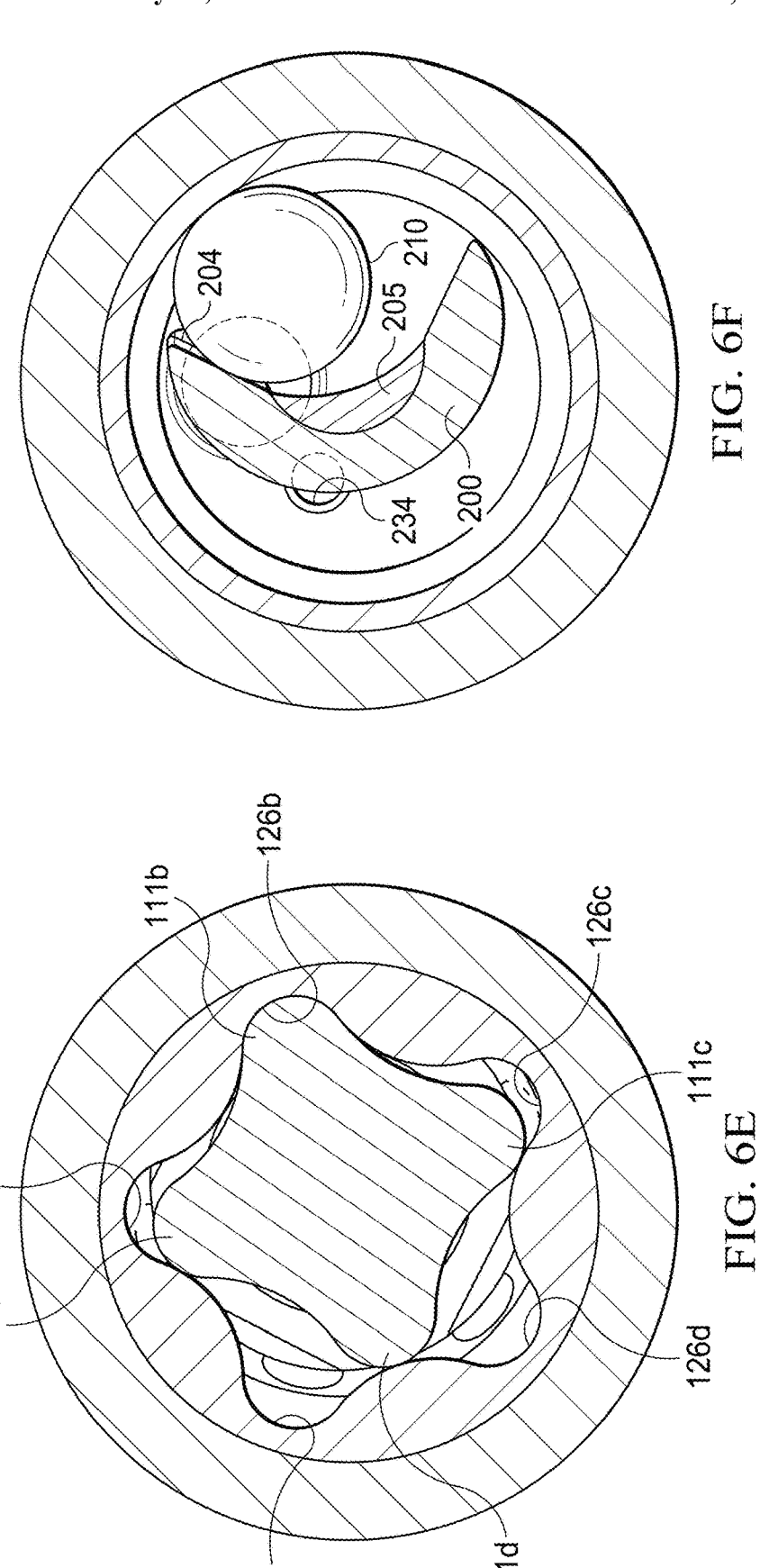
Figures 6I, 6J:
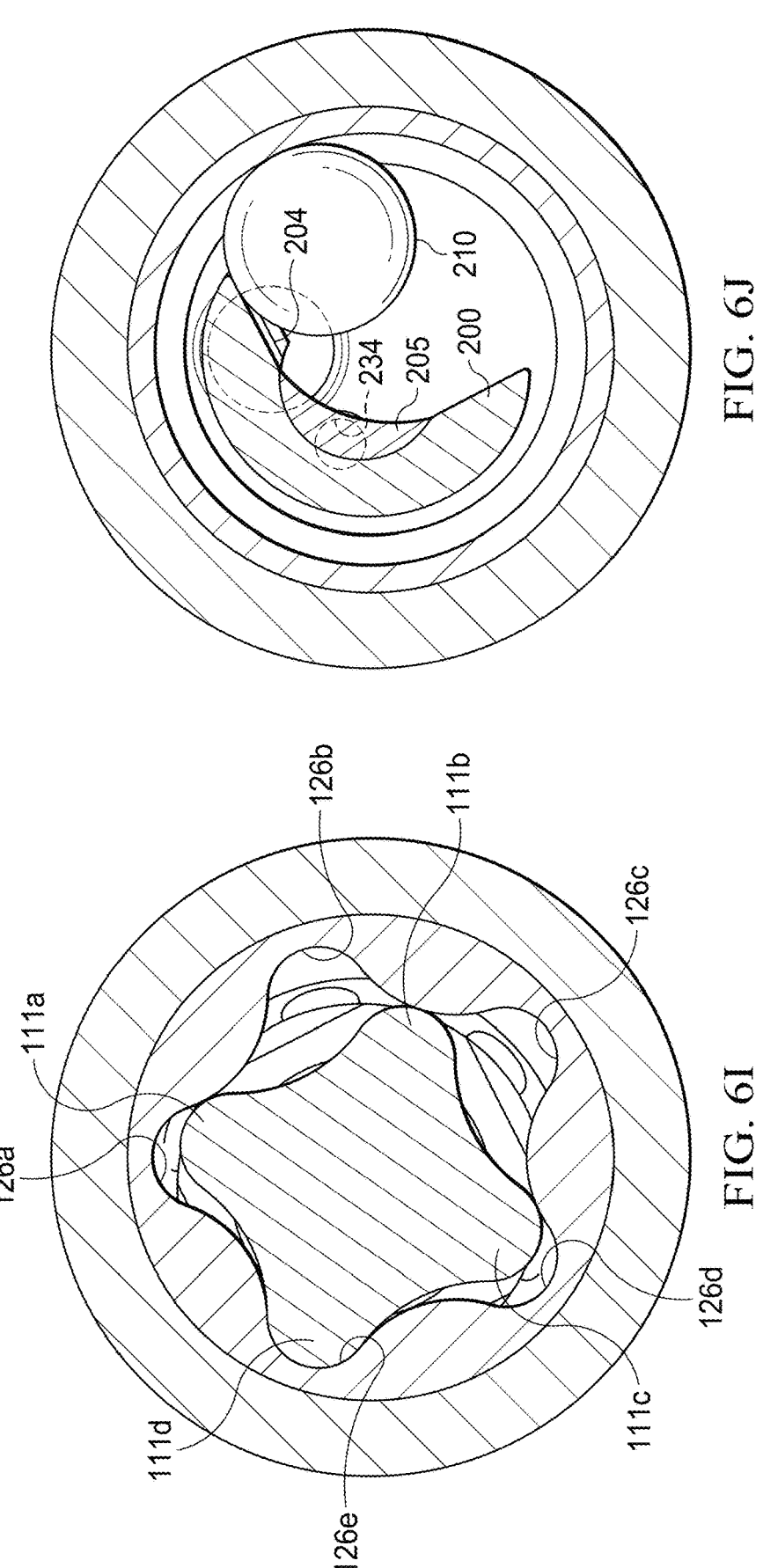
Figures 6K, 6L:
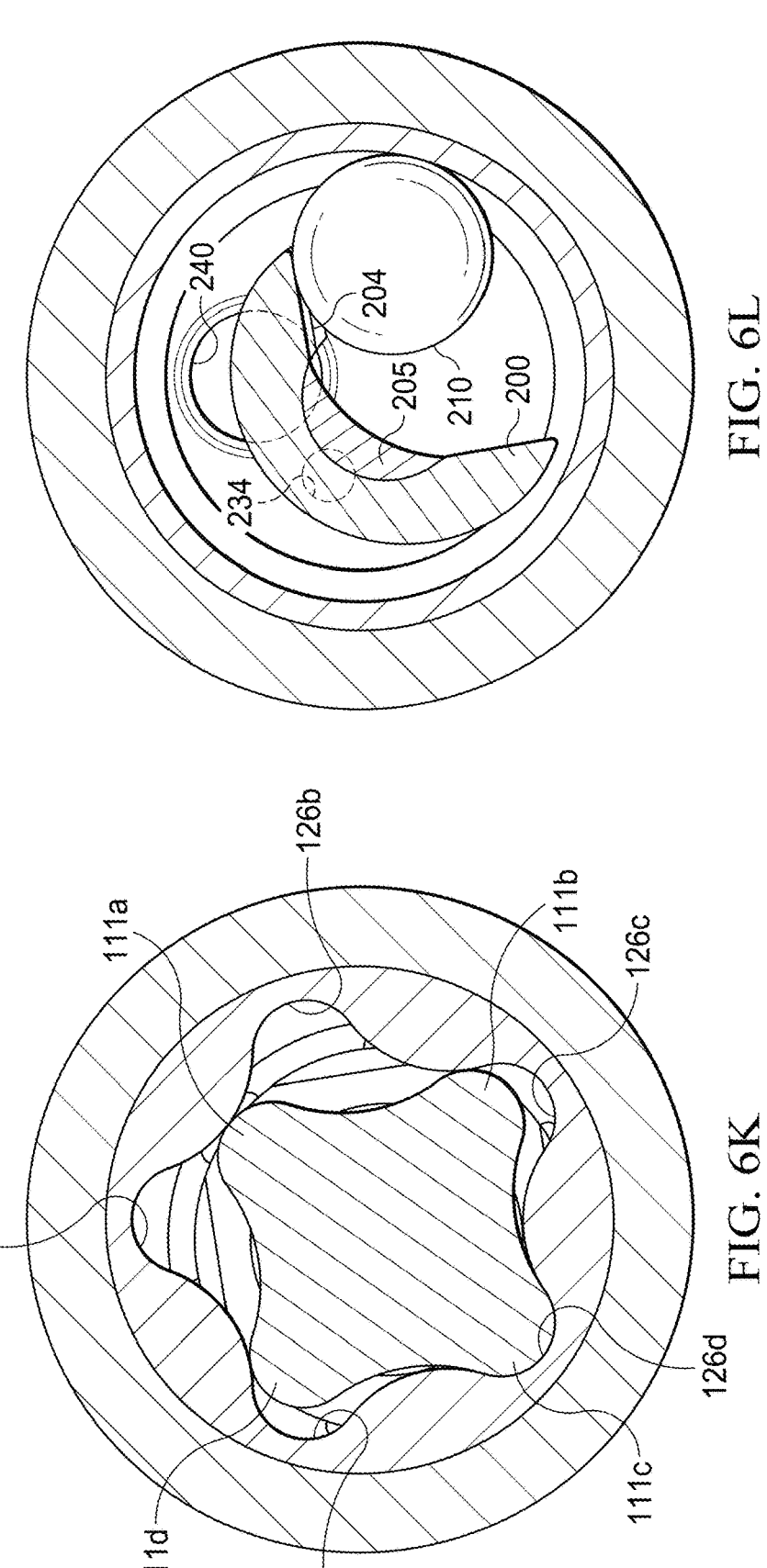
Figures 6M, 6N:
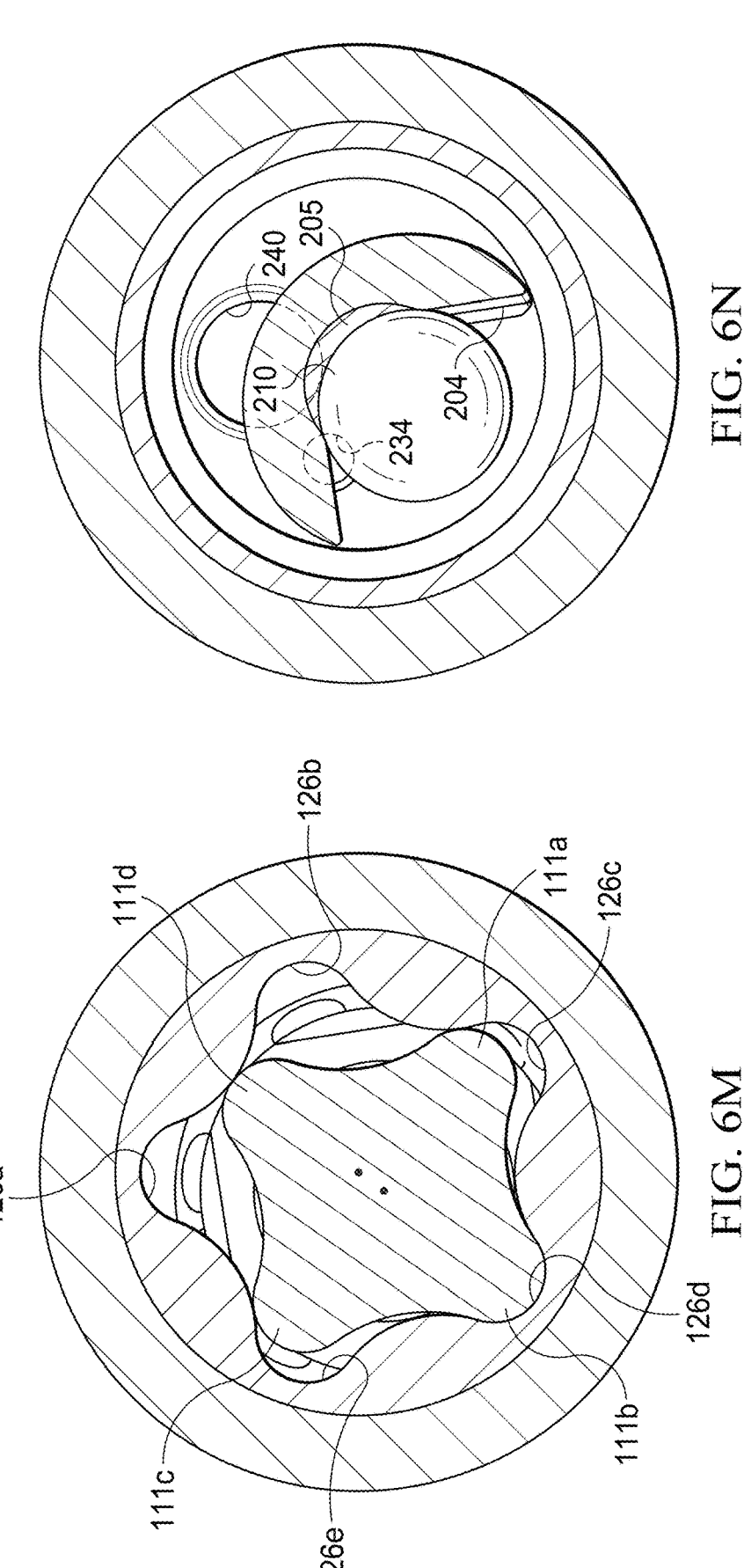
Figures 6O, 6P:
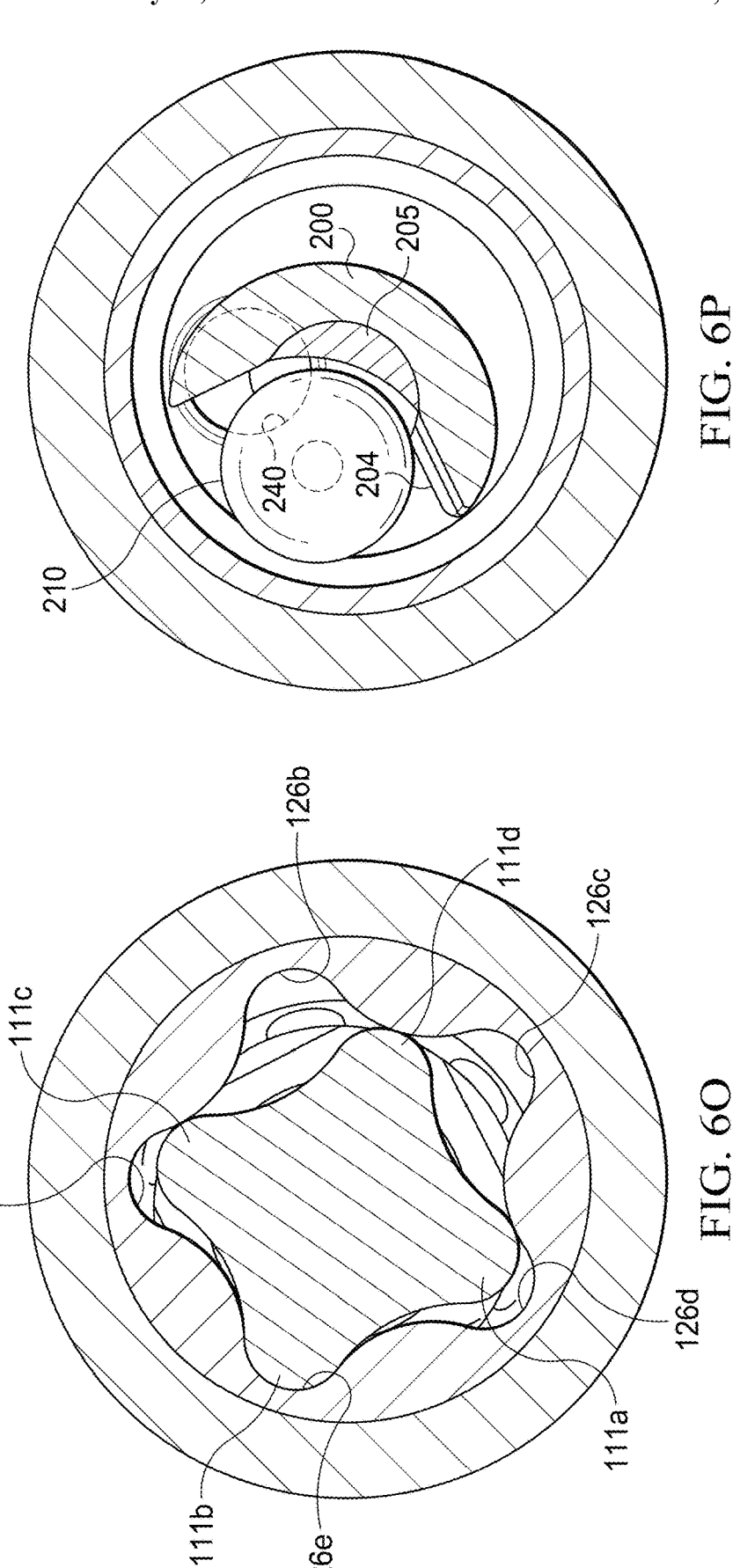
Figures 6Q, 6R:
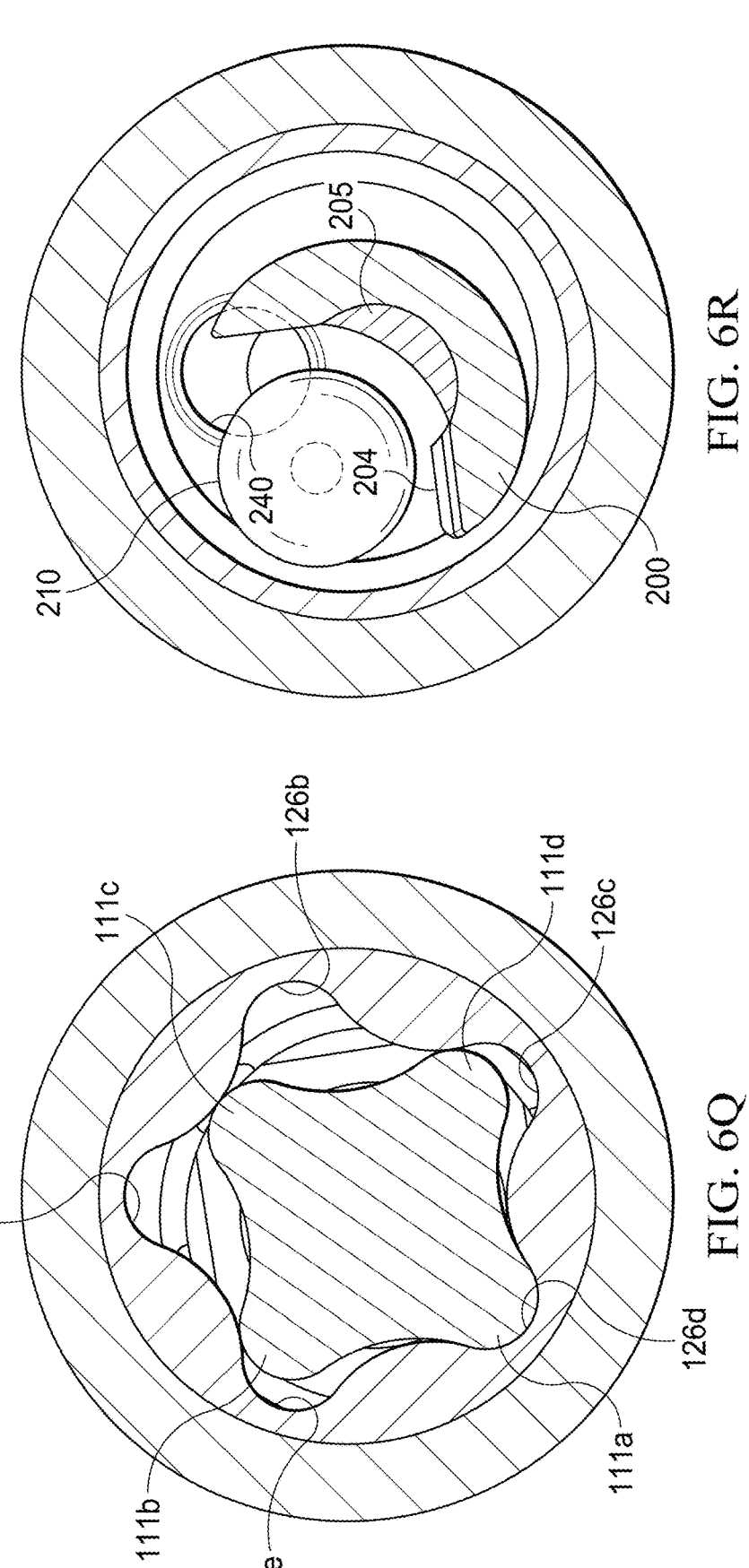
Figures 6S, 6T:
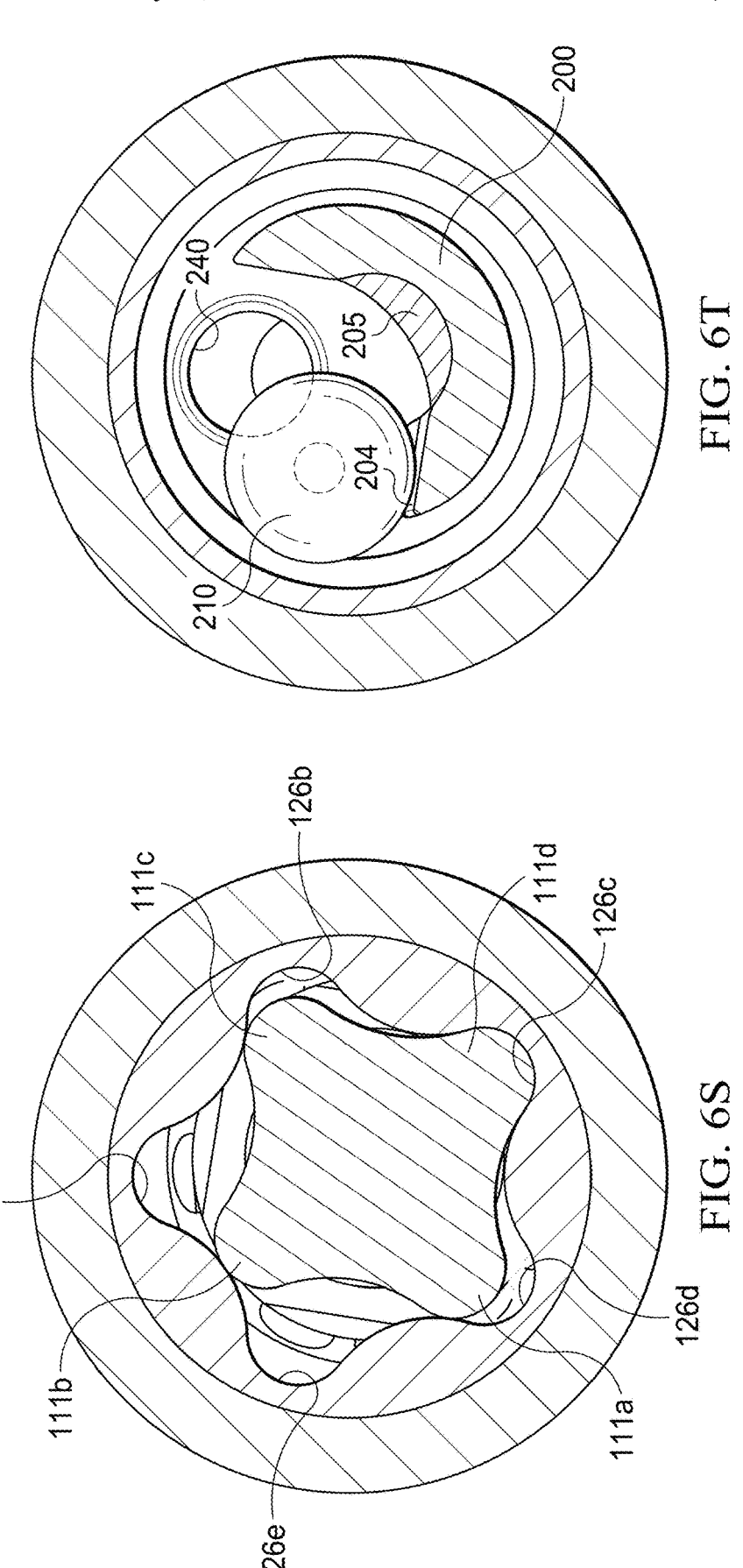
Figures 6U, 6V:
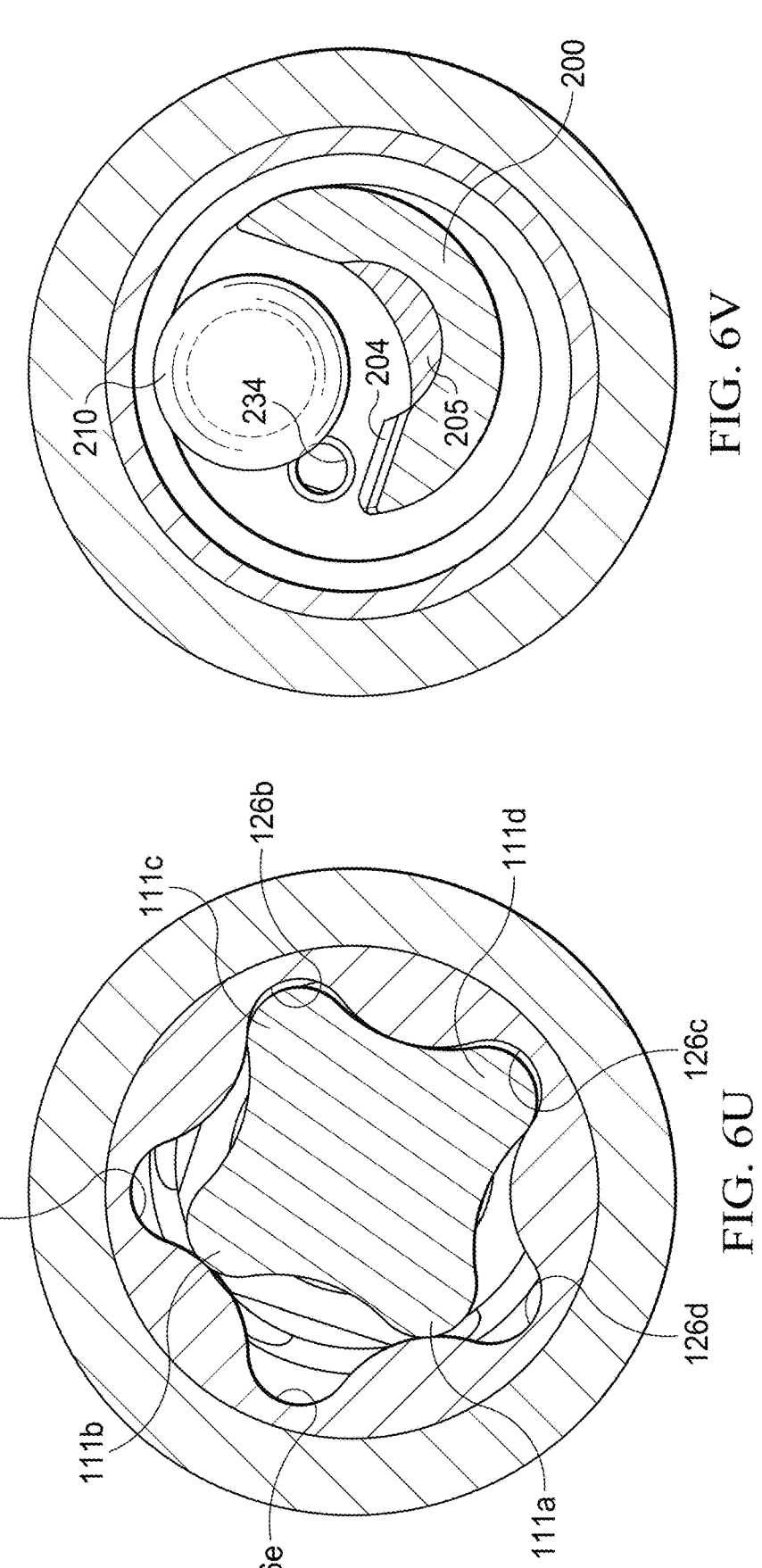
Figures 6W, 6X:
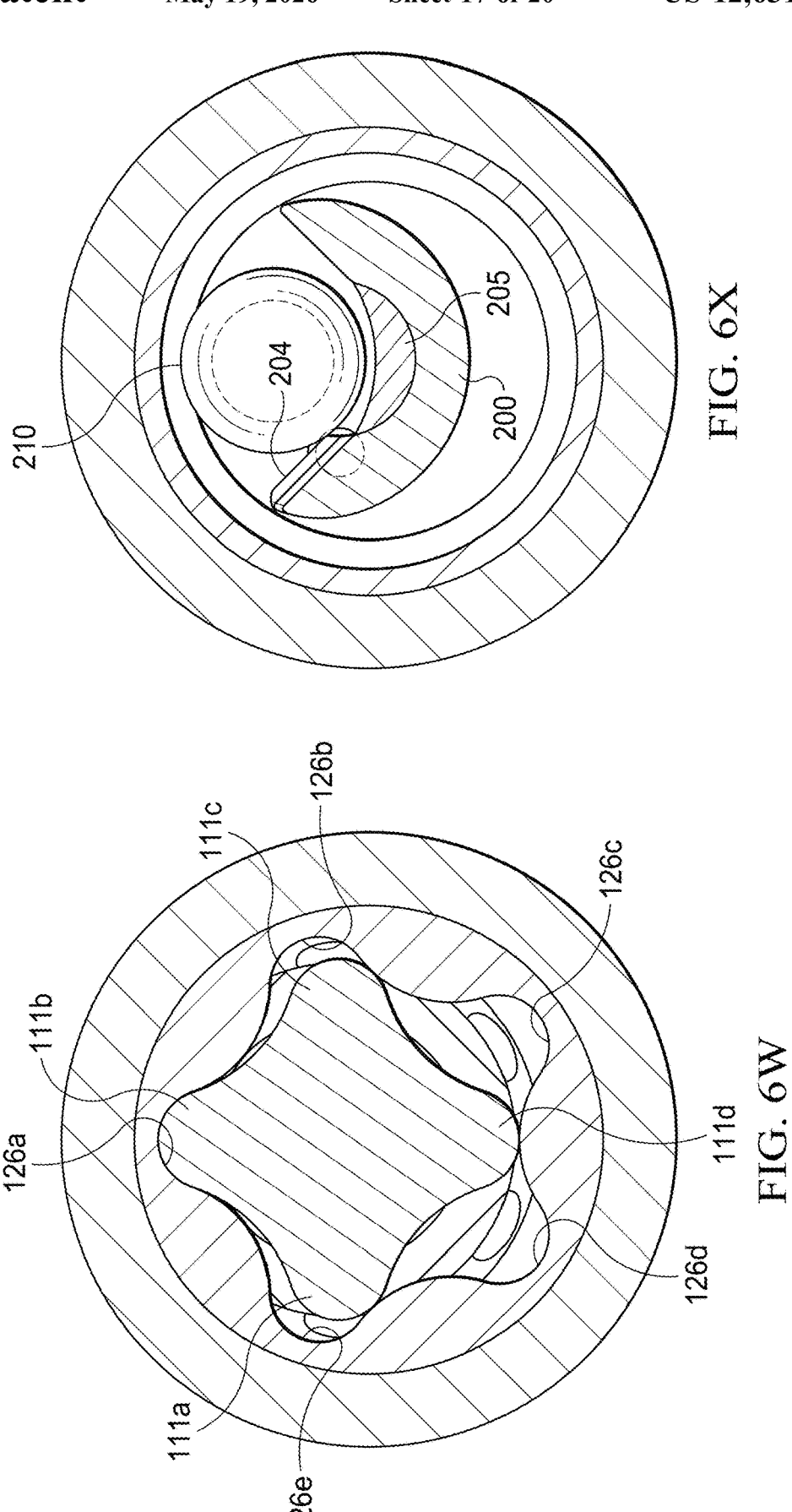

FIG. 6A-6X show cross-sectional views D-D and E-E in FIG. 1—depicting the relative orientations of rotor 110, stator 120, ball controller 220, ball 210, flow port 240, and bypass port 234—at various points in a single rotational cycle of rotor 110. FIGS. 6A-6L show the first 25% (¼) of a rotation.

FIG. 6A-6B depict the beginning of a rotational cycle, i.e., at 0% rotation. In this position, ball 210 blocks flow port 240. Rotor lobe 111d is aligned with stator lobe 126d, while rotor lobe 111a is moving toward stator lobe 126a and surface 204 of ball controller 200 is in contact with ball 210. Bypass port 234 is open.

FIG. 6C-6D depict the relative orientations of the components at 5% of a rotational cycle. Rotor lobe 111c is aligned with stator lobe 126c, while rotor lobe 111a is moving toward stator lobe 126a. Surface 204 of ball controller 200 has dislodged ball 210 from flow port 240, and a portion of ball 210 and ball controller 200 no longer obstruct a significant portion of flow port 240. Bypass port 234 remains open.

FIG. 6E-6F depict the relative orientations of the components at 10% of a rotational cycle. Rotor lobe 111b is aligned with stator lobe 126b, while rotor lobe 111a is entering stator lobe 126a. Surface 204 of ball controller 200 is holding ball 210 away from flow port 240. Bypass port 234 remains open.

FIG. 6G-6H depict the relative orientations of the components at 15% of a rotational cycle. Rotor lobe 111a is aligned with stator lobe 126a, while rotor lobe 111d is entering stator lobe 126e. Surface 204 of ball controller 200 continues to hold ball 210 away from flow port 240. Due to the configuration of surface 204, however, despite the continued rotation of ball controller 200, ball 210 has experienced very little angular movement between the rotational stages shown in FIGS. 6E-6F and 6G-6H. Bypass port 234 remains open.

FIG. 6I-6J depict the relative orientations of the components at 20% of a rotational cycle. Rotor lobe 111d is aligned with stator lobe 126e, while rotor lobe 111c is entering stator lobe 126d and rotor lobe 111a is moving toward stator lobe 126b. Ball 210 has mostly moved away from flow port 240. Bypass port 234 remains open.

FIG. 6K-6L depict the relative orientations of the components at 25% of a rotational cycle. Rotor lobe 111c is aligned with stator lobe 126d, while rotor lobe 111a is moving rapidly toward stator lobe 126b. Ball 210 has moved completely away from a position blocking flow port 240. Bypass port 234 remains open.

FIG. 6M-6N depict the relative orientations of the components at 50% of a rotational cycle. Rotor lobe 111b is aligned with stator lobe 126d, while rotor lobe 111a is entering stator lobe 126c. Flow port 240 and bypass port 234 are both open.

FIG. 6O-6P depict the relative orientations of the components at 70% of a rotational cycle. Rotor lobe 111b is aligned with stator lobe 126e, while rotor lobe 111a is entering stator lobe 126d. Flow port 240 remains open. The low pressure created by fluid flowing through bypass port 234 causes ball 210 to seat, thus blocking flow through bypass port 234.

FIG. 6Q-6R depict the relative orientations of the components at 75% of a rotational cycle. Rotor lobe 111a is aligned with stator lobe 126d, while rotor lobe 111c is moving toward stator lobe 126b. Flow port 240 remains open. Ball 210 remains seated, blocking flow through bypass port 234.

FIG. 6S-6T depict the relative orientations of the components at 80% of a rotational cycle. Rotor lobe 111d is aligned with stator lobe 126c, while rotor lobe 111a is moving toward stator lobe 126e. Flow port 240 remains open. Surface 204 of ball controller 200 is in contact with ball 210, which remains seated, blocking flow through bypass port 234.

FIG. 6U-6V depict the relative orientations of the components at 82.5% of a rotational cycle. Rotor lobe 111c is very close to being aligned with stator lobe 126b, while rotor lobe 111d has just begun to move away from stator lobe 126c. As soon as surface 204 of ball controller 200 dislodges ball 210 from bypass port 234, ball 210 moves rapidly to seat at flow port 240, due to the low pressure created by fluid flowing through flow port 240. The hydrodynamic forces on the ball are high due to the flow through flow port 240. Ball 210 accelerates continuously towards flow port 240 without obstructing the flow until it seats. Because the ball is moving with the flow, the flow restriction does not cause an increase in upstream pressure until the moment that ball 210 seats at flow port 240. This rapid seating leads to a water hammer pressure pulse as the flow from upstream is suddenly stopped.

FIG. 6W-6X depict the relative orientations of the components at 90% of a rotational cycle. Rotor lobe 111b is aligned with stator lobe 126a, while rotor lobe 111a is entering stator lobe 126e. Due to the configuration of surface 204 of ball controller 200, ball 210 remains seated at flow port 240, continuing to block flow through flow port 240. Accordingly, ball 210 will remain seated at flow port until it is dislodged by surface 204 during the next rotational cycle, as depicted in FIG. 6B. Surface 204 of ball controller 200 partially obstructs bypass port 234.

FIGS. 6A-6X illustrate a particular alignment between ball controller 200, flow port 240, rotor lobes 111a-111d, and stator lobes 126a-126e. This particular alignment has been shown to be effective, although other alignments could also be possible.

FIG. 7 depicts a model of the pressure pulses that would be generated by the embodiment described above, operating at a flow rate of 5 barrels per minute, on tubing with an inner diameter of 2.4" with 20% bypass and a flow port 240 having a diameter of 0.63". The differential pressure at the rotation angles corresponding to the positions shown in FIGS. 6A-6X are indicated.

FIG. 8 depicts an upstream pressure pulse generated by a prototype of the embodiment described above. In this example, water was flowed through the tool at a rate of 3 barrels per minute. At this flow rate, the tool produces 500 psi pulses at a cycle rate of 3.2 Hz.

This pressure profile is characterized by a rapid increase in pressure as the valve closes—i.e., as ball 210 seats at flow port 240—followed by a more gradual reduction in pressure as the valve opens—i.e., as ball 210 is dislodged from flow port 240. This profile is designed to impart a forward motion to tubing lying in a horizontal well. A volume of fluid moves down the tubing a distance equal to the pulse width times the speed of sound, and that volume of fluid has a momentum that is converted to a downhole impulse. For example, if the fluid is water (such that the speed of sound is approximately 1400 meters per second) flowing at a rate of 3 barrels per minute, a pulse of 0.12 seconds corresponds to a distance traveled of 170 meters by a volume of fluid having a mass 350 kilograms. This volume of fluid acts as a 350-kilogram hammer moving at approximately 4 meters per second. The rapid increase in pressure generates a downward force pulse that breaks the friction in the tubing and impels it forward.

At a flow rate of 5 barrels per minute, a typical 3.5" positive displacement motor with 4 rotor lobes and 5 stator lobes will rotate at approximately 500 rotations per minute. At that rate, ball controller 200 will make approximately 8 rotations per second and ball 210 moving on a 2" diameter circle will be moving at an average speed of approximately 1 meter per second, although much faster at the point of seating and immediately after being dislodged. One of ordinary skill in the art will understand that various features of the embodiment described above could be varied to control the operating parameters. For example, rotor 110 could comprise a hollow shaft, which would reduce the rotary speed and cycle rate. In addition, as noted above, positive displacement power section 101 could have a different number of lobes, including but not limited to 5 rotor lobes and 6 stator lobes or 7 rotor lobes and 8 stator lobes. Increasing the number of lobes will reduce the extent of off-axis hypocycloidal motion, which may simplify the design of ball controller 210.

As depicted in FIG. 9, in an alternate embodiment of the invention, a diffuser passage 300 is incorporated downstream of wear disc 230. Diffuser passage 300 may comprise a conical, expanding passage with an inlet diameter substantially equal to the diameter of flow port 240 and gradually increasing in the downhole direction. Diffuser passage 300 may act to recover some of the pressure differential through the tool and thereby reduce the differential pressure when ball 210 is not blocking flow port 240. Reduced operating pressure differential is desirable as it reduces pumping pressure requirements and wear on flow port 240.

Although the embodiment described above comprises positive displacement power section 101, one of ordinary skill in the art will understand that alternate embodiments could include other rotary drive mechanisms configured to rotate ball controller 200. For example, a turbine or rotary electric motor could be used instead of positive displacement power section 101.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A flow control apparatus comprising:
a central longitudinal axis;
a flow inlet;
a flow outlet;
a flow port disposed between the flow inlet and the flow outlet;
a ball configured to intermittently obstruct at least a portion of a flow of fluid through the flow port;
a ball controller configured to rotate about the central longitudinal axis and comprising:
a volume within which the ball is disposed;
a lower radial surface; and
a surface axially extending from the lower radial surface;
a rotary drive mechanism coupled to the ball controller and configured such that, during each rotation, the ball controller will have:
a first angular position in which the ball at least partially obstructs the flow port; and
a second angular position in which the ball does not obstruct the flow port.

2. The flow control apparatus of claim 1, wherein the rotary drive mechanism is further configured such that, during each rotation, the ball controller will have a third angular position in which the ball is able to move freely toward the flow port.

3. The flow control apparatus of claim 2, wherein the ball at least partially obstructs the flow port when the ball controller is in the third angular position.

4. The flow control apparatus of claim 1, further comprising a bypass port that allows fluid to flow from the inlet to the outlet when the ball controller is in the first angular position.

5. The flow control apparatus of claim 1, wherein the rotary drive mechanism comprises a positive displacement power section.

6. The flow control apparatus of claim 5, wherein the positive displacement power section comprises:
a rotor comprising four lobes; and
a stator comprising five lobes.

7. The flow control apparatus of claim 1, wherein the rotary drive mechanism is rigidly coupled to the ball controller.

8. The flow control apparatus of claim 1, wherein the rotary drive mechanism is flexibly coupled to the ball controller.

9. The flow control apparatus of claim 1, further comprising an expanding, conical passage disposed between the flow port and the outlet.

10. The flow control apparatus of claim 1, wherein the ball controller further comprises a removeable wear insert.

11. The flow control apparatus of claim 1, further comprising a wear ring disposed within the flow port.

12. The flow control apparatus of claim 1, wherein the ball is formed from one of carbide cermet, silicon nitride, or zirconia.

13. The flow control apparatus of claim 1, further comprising a seat disc in which the flow port is disposed.

14. A method of generating pressure pulses in a wellbore, the method comprising:
introducing into the wellbore a flow control apparatus comprising:
a central longitudinal axis;
a flow inlet;
a flow outlet;
a flow port disposed between the flow inlet and the flow outlet;
a ball configured to intermittently obstruct at least a portion of a flow of fluid through the flow port;
a ball controller configured to rotate about the central longitudinal axis and comprising:
a volume within which the ball is disposed;
a lower radial surface; and
a surface axially extending from the lower radial surface;
a rotary drive mechanism coupled to the ball controller and configured such that, during each rotation, the ball controller will have:
a first angular position in which the ball at least partially obstructs the flow port; and
a second angular position in which the ball does not obstruct the flow port; and
pumping fluid into the wellbore and through the inlet, causing rotation of the rotary drive mechanism and the ball controller, such that obstruction of fluid flow through the flow port when the ball controller rotates through the first angular position generates a pressure pulse.

15. The method of claim 14, wherein the flow control apparatus further comprises a bypass port that allows fluid to flow from the inlet to the outlet when the ball controller is in the first angular position.

16. The method of claim 14, wherein the rotary drive mechanism comprises a positive displacement power section.

17. The method of claim 14, wherein the rotary drive mechanism is rigidly coupled to the ball controller.

18. The method of claim 14, wherein the flow control apparatus further comprises an expanding, conical passage disposed between the flow port and the outlet.

19. A method of extending the reach of tubing within a wellbore, the method comprising:

introducing into the wellbore a section of tubing which includes a flow control apparatus comprising:

a central longitudinal axis;

a flow inlet;

a flow outlet;

a flow port disposed between the flow inlet and the flow outlet;

a ball configured to intermittently obstruct at least a portion of a flow of fluid through the flow port;

a ball controller configured to rotate about the central longitudinal axis and comprising:

a volume within which the ball is disposed;

a lower radial surface; and a surface axially extending from the lower radial surface;

a rotary drive mechanism coupled to the ball controller and configured such that, during each rotation, the ball controller will have:

a first angular position in which the ball at least partially obstructs the flow port; and a second angular position in which the ball does not obstruct the flow port; and pumping fluid into the tubing and through the inlet, causing rotation of the rotary drive mechanism and the ball controller, such that obstruction of fluid flow through the flow port when the ball controller rotates through the first angular position generates a pressure pulse;

wherein the pressure pulse generated by the flow control apparatus creates a net downhole force thereby moving the tubing farther into the wellbore.

20. The method of claim 19, wherein the rotary drive mechanism comprises a positive displacement power section.

* * * * *